April 14, 1953        I. I. TUBBS        2,634,785
VEHICLE TIRE
Filed May 2, 1949        3 Sheets-Sheet 1
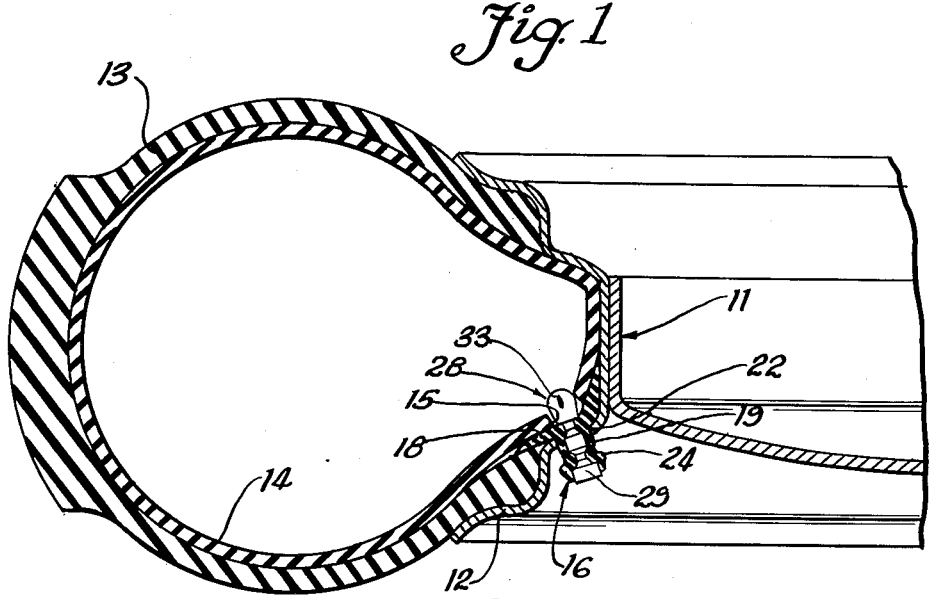
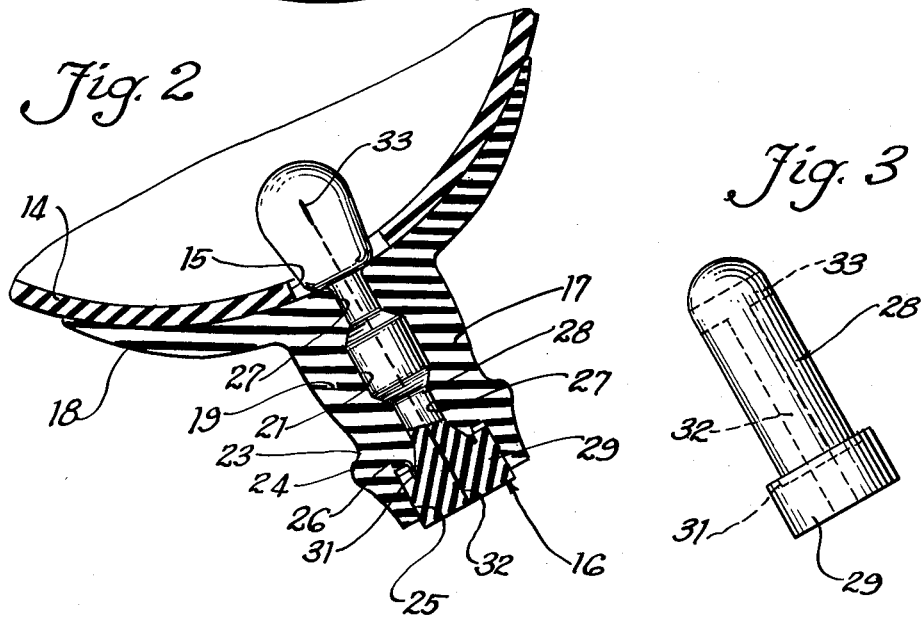
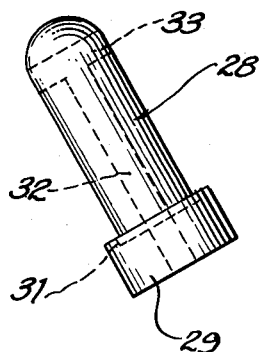
INVENTOR.
Irl I. Tubbs
BY Sheridan, Davis & Cargill
Att'ys April 14, 1953    I. I. TUBBS    2,634,785
VEHICLE TIRE Filed May 2, 1949    3 Sheets-Sheet 2

INVENTOR.
Irl I. Tubbs
BY Sheridan, Davis & Cargill
attys

April 14, 1953  I. I. TUBBS  2,634,785
VEHICLE TIRE
Filed May 2, 1949   3 Sheets—Sheet 3
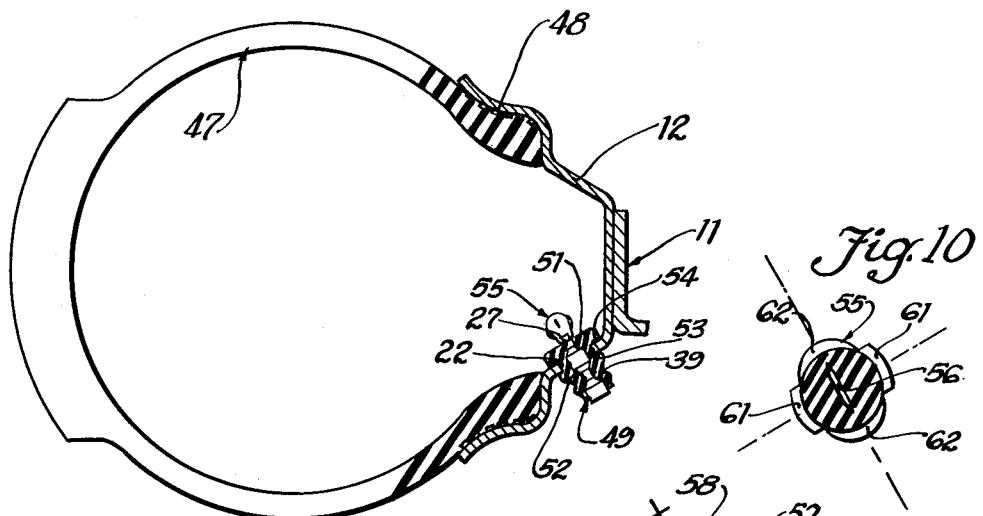
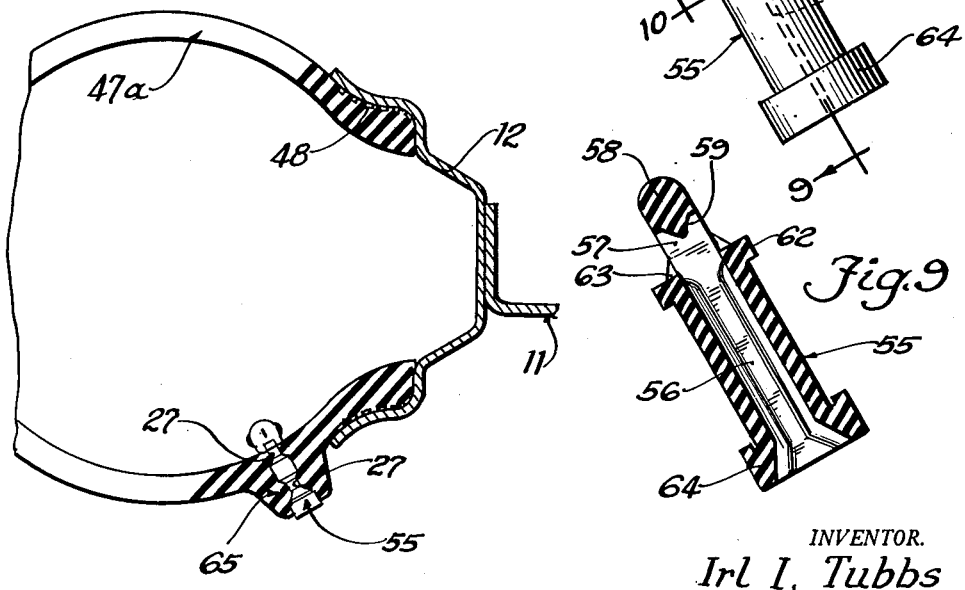
INVENTOR.
Irl I. Tubbs
BY Sheridan, Davis & Cargill
att'ys Patented Apr. 14, 1953

2,634,785

UNITED STATES PATENT OFFICE 2,634,785

VEHICLE TIRE

Irl I. Tubbs, Mount Vernon, Iowa, assignor to Margaret L. Tubbs, trustee, Mount Vernon, Iowa Application May 2, 1949, Serial No. 90,897

11 Claims. (Cl. 152—427)

This invention relates in general to automotive vehicles, and more particularly to improvements in tires therefor.

A principal object of the invention is to render any vehicle tire more reliable and serviceable and easier to manufacture, while reducing the cost thereof, by providing a novel all-rubber valve which may readily be incorporated in, and employed with, any known type of tire, including those employing inner tubes and the newer "tubeless" tires.

More specifically, the novel all-rubber valve, which constitutes the heart of the present invention, comprises a casing member having an axially disposed bore extending therethrough that is reduced in cross-section or restricted at its inner end, and a plug removably disposed in such bore and having an axially extending slit through which an inflating needle or plug-inserting or removing tool may be inserted; the plug being of greater cross-sectional area than the bore of the valve casing, before being mounted therein, and insertable in the casing by axial extension or stretching to reduce such normal cross-sectional area temporarily to less than that of the casing bore; and the restricted inner end of the latter insuring retention of the plug under circumferential compression to maintain the slit in the plug closed upon removal of such needle or tool.

The above mentioned valve is disclosed and claimed in my co-pending United States Letters Patent application Serial No. 740,601, filed April 10, 1947, for Pneumatic Cushion.

Another important object of the invention is to prevent the damage or destruction of the tube or the casing normally resulting when the usual metal valves of the prior art are employed, in the event of a flat tire being sustained while driving.

A further object is to provide a pneumatic tire which has substantially perfect static and kinetic balance.

Another object is the provision of a vehicle tire which may be inflated faster than those of the prior art and has a valve that is substantially leakproof and cannot be damaged by the application of blows or the like thereto.

Numerous other objects and advantages of the invention will be apparent as it is better understood from the following description, which, when taken in connection with the accompanying drawings, discloses a preferred embodiment thereof.

In the drawings:

Figure 1 is a sectional view of a conventional tire casing and part of a vehicle wheel on which the same is mounted, taken radially of the wheel, and showing an all rubber valve attached to an inner tube for such tire and extending through a suitable aperture in the rim of the wheel;

Fig. 2 is an enlarged detail sectional view taken longitudinally through the all rubber valve of Fig. 1 with the inner tube separated from the tire casing and rim;

Fig. 3 is an elevational view of the plug of the valve of Fig. 2 as it appears before insertion in the valve casing;

Fig. 6 is a view similar to Fig. 1 showing another all rubber valve of modified construction mounted directly in a suitable aperture in the rim of a wheel provided with a tubeless tire;

Fig. 7 is a sectional view like Figs. 1 and 6 showing a tubeless tire in which the valve casing is formed integrally with the tire casing, and a valve plug similar to that of Fig. 8 is mounted therein;

Figure 4:
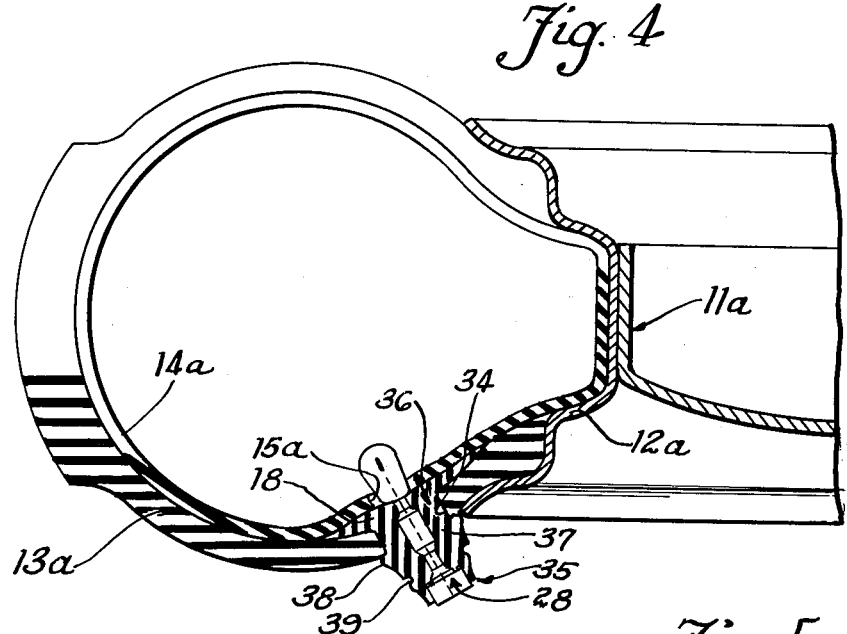
Fig. 4 is a view similar to Fig. 1 showing an all rubber valve mounted in a suitable aperture in a side wall of the tire casing, rather than cooperating directly with the wheel rim.

Fig. 8 is a view similar to Fig. 3 of the modified form of valve plug employed in the tire of Fig. 6; and Figs. 9 and 10 are sectional views of this modified form of valve plug, taken substantially on the lines 9—9 and 10—10 respectively, of Fig. 8.

Referring more particularly to Figs. 1 to 3 of the drawings, reference numeral 11 indicates in general a conventional vehicle wheel which includes the usual drop-type rim 12. Mounted in well-known manner on this rim 12 (Fig. 1) is a conventional tire casing 13 having an inner tube 14 disposed therein. As best seen in Fig. 2, the inner tube 14 is provided with a suitable aperture 15 and an all rubber valve, indicated generally by reference numeral 16, which overlies this aperture and is adhered to the outer surface of the tube 14. This valve 16 comprises a rubber valve casing, indicated generally by reference numeral 17, which is made up of a base flange 18 formed integrally with an outwardly extending neck portion 19 having a bore 21 extending axially therethrough and communicating at its inner end with the aperture 15 in the inner tube 14. It will be understood that the base flange 18 of this valve casing 17 may be adhered to the outer surface of the inner tube 14 in any suitable manner, and this attachment of the valve casing to the inner tube preferably is accomplished by vulcanizing the same thereto during the process of manufacture of the inner tube. It will also be appreciated that under some circumstances, depending upon the nature of the material employed in making the inner tube 14, this valve casing 17 may be formed as an integral part of the inner tube.

The outer diameter of the neck portion 19 of the valve casing 17 adjacent the base flange 18 is slightly larger than the diameter of an aperture 22 provided in the rim 12 of the wheel through which this neck portion of the valve casing extends when the tire is mounted on the rim, in the manner illustrated in Fig. 1, for a purpose to be later more fully described. Intermediate its ends, the outer surface of the valve casing 17 may be provided with an annular recess 23 (Fig. 2) and a circumferential flange 24, the outer diameter of the latter being somewhat greater than that of the inner end of the neck portion 19. The inner edge of this flange 24 joins the outer surface of the recess 23, and the outer side wall of this flange 24 may have a curvature of larger radius to form a smooth, substantially conical surface with the outer surface of the outer end of the neck portion 19, the smaller diameter of the conical surface being slightly less than that of the aperture 22 in the rim 12. The outer end of the bore 21 of the valve casing 17 is enlarged to provide a recess 25 having an inwardly extending annular groove in its bottom surface defining an axially extending flange 26, for a purpose to be later described. The inner end of this bore 21 is reduced to provide a restricted portion 27, and a similar restricted portion 27 is formed in the bore adjacent the outer recess 25.

In addition to this valve casing 17, the valve 16 comprises a rubber valve plug which is indicated generally by reference numeral 28 and is shown separate from the casing in Fig. 3. This valve plug 28 comprises a main body portion substantially cylindrical in shape, and of greater normal diameter than that of the bore 21 of the valve casing 17, which terminates at its outer end in an enlarged head or flange portion 29 of slightly greater diameter than that of the enlarged outer end portion 25 of the bore 21. At the juncture of this end flange 29 with the main body portion, the valve plug 28 is provided with an annular recess 31 extending axially into the end flange 29 with its inner wall concentric with the outer surface of the main body portion of the valve plug. After this valve plug 28 has been molded or otherwise so formed, a suitable cutting tool is employed to make an axially disposed slit 32 therein which extends from the end surface of the head or flange 29 into communication with a similar transverse slit 33 passing through the body portion adjacent its inner end. This compound slit 32, 33 preferably is formed by a sharp or quick cutting action, in the manner illustrated and described in my prior U. S. Letters Patent No. 2,318,115, issued May 4, 1943. Such a slit provides a suitable passage for a hollow inflating needle or a valve plug extending or removing tool, as shown and described in said prior patent, but normally remains closed even when the valve plug is not mounted in the valve casing 17, as illustrated in Fig. 3, due to the natural cohesion between the rubber surfaces defining such slit, because the same is cut without removing any of the material of the valve plug. The reason for not extending the axial slit 32 completely through the valve plug 28 is to provide a stop adjacent the inner end thereof against which a blunt-ended inserting tool will abut when inserted therein. The valve plug then may be stretched or extended axially on such tool by grasping the end flange 29, which results in a corresponding cross-sectional reduction of the plug to enable the same to be inserted readily into the bore 21 of the valve casing 17. When so inserted with the end flange 29 pressed into the enlarged recess 25 at the outer end of the bore 21, if this end flange is restrained against outward movement and the inserting tool withdrawn from the slit 32, the valve plug 28 will assume its position of Fig. 2 in the valve casing 17. So disposed in the valve casing, the inner end of the plug 28 will assume substantially the shape illustrated in Fig. 2, with a portion of the main body of the plug constricted and held in circumferential compression and axial tension by the main part of the bore 21 of the housing, and intermediate portions of the plug further so constricted by the restricted portions 27 of the valve casing bore. Such constricting of the major portion of the main body of the valve plug 28 will insure maintaining of the slit 32 in a tightly closed condition, and the portions of the valve casing 17 defined by the restricted portions 27 of the bore 21 will function in the manner of strong rubber bands to make certain of such closure of the slit 32 against extremely high pressures obtaining interiorly of the inner tube 14. The inner restricted portion 27 also functions to substantially positively prevent expulsion of the valve plug 28 from the casing 17 by any pressure of air or other fluid contained within the inner tube, and likewise prevents unintentional withdrawal of the valve plug from the casing 17 during removal of the inserting tool therefrom. This specific shape of the valve casing 17 further functions to increase the normal restricting force applied thereto against the valve plug 28 when the pressure in the inner tube 14 is increased. This is because increased pressure within the inner tube will tend to move the base flange 18 outwardly against its retaining structure, such as the rim 12 illustrated in Fig. 1, resulting in an outwardly directed bending moment being thereby applied against the outer edge of the inner restricted end 27 of the bore 21 which is, in effect, fulcrumed at the inner edge of the restraining structure, such as the inner edge of the aperture 22 in the rim 12 of Fig. 1.

The desire to so cause increasing pressures within the inner tube to increasingly constrict the embraced portion of the valve plug 28 is one reason for making the outer diameter of the inner end of the neck portion 19 of the valve casing slightly greater than that of its receiving aperture 22, as previously described. Another reason for so dimensioning these cooperating parts is to hold the inner tube 14 slightly away from the rim 12 of the wheel, until the tube is substantially filled, to prevent the tire casing 13 from pinching the tube as the casing is expanded into its proper position on the rim during inflation of the tire. It will be understood that in mounting the tire and tube of Fig. 1 on the vehicle wheel, a suitable cord, tool, or the like, will first be engaged around the valve casing 17 in the recess 23, or one of the latter if more than one of such recesses are provided. The end of this cord or the like is then drawn through the rim aperture 22 when the deflated tube and the tire casing are mounted on the rim, so that the outer end of the neck portion 19 may be withdrawn thereby outwardly through the aperture 22. During initial inflation of the tube, the flange 24 on the stem of the valve casing will offer sufficient resistance to inward movement of the valve casing relative to the rim to facilitate insertion of a hollow needle-type inflating tool through the slit 32, 33.

It is thought that the numerous advantages of this novel construction, as enumerated hereinbefore in the objects of the invention, now will better be understood. There is no metal employed in this novel construction to damage the tube or the tire casing in the event of a flat tire, and the inner tube will not be damaged under such circumstances by a locking of the valve stem in the wheel rim. Since the all rubber valve structure above described is of extremely light weight, it will not appreciably affect either the static or kinetic balance of the wheel and tire. Such relatively extensive sealing surfaces of pliable rubber against pliable rubber are provided with this novel valve structure that relatively large amounts of sand or other foreign material may be forced into this valve without destroying its effectiveness. Furthermore, this construction permits a more rapid inflation of the tire and/or the ready introduction of water or other liquid therein, which is desired in the case of tractor tires, or the like, under certain circumstances, because of the relatively large passage provided by a hollow inflating needle which is insertable through the valve.

While being much more reliable under all conditions of operation than the prior art structures available for this use, it may be found desirable under some circumstances to remove and replace the plug 28 of the valve 16. This may be readily accomplished by first inserting the jaws of a long-nosed pair of pliers, or other suitable tool, between the head flange 29 of the plug and the enlarged recess 25 of the valve casing housing the same, to obtain a secure grip upon the head flange. Such action is facilitated by the flange 26 and recess 31 which provide a rolled flange for the plug removing tool to work against and prevent damaging of the parts of the valve. The same type of tool used for inserting the valve plug 28 in the valve casing 17 may then be inserted through the slit 32 to stretch or extend the valve plug to reduce the cross-section thereof sufficiently to enable ready removal of the plug from the valve casing. The cooperating flanges, formed by the flange 26 of the casing and the annular recess 31 in the valve plug 28, also assist in preventing pushing of the valve plug inwardly too far relative to the valve casing during insertion of a valve plug 28 in the valve housing 17 and whenever an inflating or other tool is inserted into the slit 32.

Referring now to Fig. 4, a vehicle wheel, indicated generally by reference numeral 11a, is therein illustrated which is substantially identical to the wheel 11 of Fig. 1, except that the rim 12a does not have the valve-receiving aperture of the rim 12 of Fig. 1. The tire illustrated in this modification of the invention comprises a casing 13a having an aperture 34 in a side wall thereof which is preferably located adjacent the bead of the casing in relatively close proximity to the outer edge of the rim 12a, when the casing is mounted thereon. Disposed within this tire casing 13a is an inner tube 14a similar in all respects to the inner tube 14 illustrated in Fig. 1, except that the all rubber valve, indicated herein generally by reference numeral 35, and an aperture 15a are differently located than the valve 16 and aperture 15 of Fig. 1, being provided in a side wall of the inner tube so as to be alignable with the aperture 34 in the casing 13a. In other words, the modification of Fig. 4 differs from that of Fig. 1 in that the all rubber valve 35 extends through an aperture 34 in the tire casing 13a, rather than cooperating with a similarly functioning aperture 22 in the rim 12 of the wheel. For this reason, the valve 35 comprises a valve casing 36 having a different outer configuration from the valve casing 17 of Figs. 1 and 2. This valve casing 36 is made up of a base flange 18 identical to the base flange 18 of the valve casing 17, and a neck portion 37 having the same inner bore construction as the valve casing 17. The same valve plug 28 therefore is adapted to be employed with this casing 36 as that shown in Figs. 1 to 3. The neck portion 37 of the valve casing 36 of Fig. 4 has an outer diameter at its inner end which is just slightly greater than that of the tire casing aperture 34, and is provided intermediate its ends with an annular flange or rib 38 of substantially greater diameter and spaced outwardly from the base flange 18 a distance approximately equal to the thickness of the side wall of the tire casing 13a through which the aperture 34 extends. The outer surface of the neck portion 37 decreases in diameter outwardly from this rib 38 to facilitate the drawing of this neck portion of the valve casing outwardly through the aperture 34 in the tire casing. Adjacent its outer end, this neck portion 37 is provided with a circumferential groove 39 for engagement by a cord, or suitable tool, to facilitate such mounting of the valve 35 in the tire casing 13a.

With this arrangement illustrated in Fig. 4, the tire casing functions in conjunction with the all rubber valve in similar manner to the cooperation above-described between the valve 16 and the rim 12 of Fig. 1. Since the inner end of the neck portion 37 is slightly larger than the aperture 34, the outward forcing of the valve 35 into its position of Fig. 4, either by an outwardly applied force or in response to pressure introduced into the inner tube 14a, will tightly seal the aperture 34 against leakage or introduction therethrough of any foreign material. Likewise, the same manner as above described relative to the modification of Fig. 1, increasing pressures within the inner tube will result in corresponding increases of the constricting forces applied by the restricted inner end of the bore of the valve casing against the intermediate portion of the valve plug 28 engaged thereby. This modification of Fig. 4 has the additional advantage of facilitating mounting of the inner tube in the casing before the latter is mounted on the rim 12a of the wheel.

Figure 5:
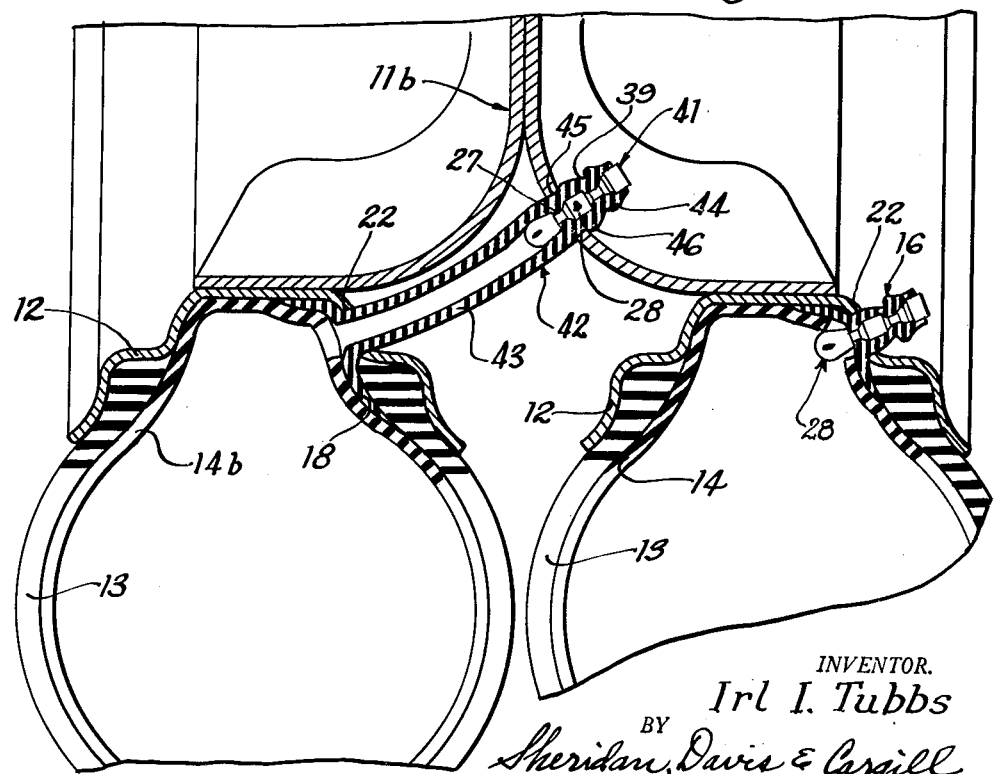
Fig. 5 is a view similar to Fig. 1 showing the application of the invention to a dual wheel construction.

Figure 5 illustrates the application of the instant invention to a dual wheel assembly, indicated generally by reference numeral 11b. This conventional dual wheel includes two rims 12 identical with the rim 12 of the modification of Fig. 1. As shown in this figure, the outer rim 12, that illustrated at the right side, has a tire casing 13, inner tube 14 and all rubber valve 16, identical to those of Fig. 1, mounted thereon. A similar tire casing 13 likewise is mounted on the inner rim 12. However, the all rubber valve provided with the inner tube 14b for use on this inner rim is constructed differently from those hereinbefore described to facilitate inflation of the inner tire. This valve, which is indicated generally by reference numeral 41, comprises a casing 42 having a base flange 18, similar to those of the valves 16 and 35, preferably formed integrally with an elongated tubular portion 43 extending through the rim aperture 22 and terminating at its outer end in a neck portion 44. It is preferred that this valve casing 42 be made of rubber, although any other suitable material may be employed. The wheel 11b is provided with an aperture 45 dimensioned similarly to the rim aperture 22 and disposed adjacent the outer rim 12. The inner end of the neck portion 44 preferably has an outer diameter slightly greater than that of the aperture 45, and this neck portion may be provided with an annular flange or rib 46 similar to the rib 38 of the valve 35 of Fig. 4. A circumferential groove 39, like that illustrated in Fig. 4, similarly may be provided in the outer surface of this neck portion 44, and the latter has an inner bore formed like those of the valves 16 and 35, with restricted portions 27, to receive a valve plug 28. The tubular portion 43 of this valve casing 42 is of sufficient length to enable mounting of the neck portion 44 in the wheel aperture 45 in the manner illustrated in Fig. 5, and such mounting of this valve 41 is accomplished in the same manner as previously described relative to the mounting of the valves 16.

A further modification of the present invention is illustrated in Fig. 6, wherein reference numeral 47 indicates a tubeless type of tire casing having a plurality of concentric ridges 48 around the outer edges of the beads thereof, where the latter engage the rim 12. The wheel 11 of this figure is substantially identical to that illustrated in Fig. 1, with the rim 12 provided with the valve-receiving aperture 22. Upon inflation of this tubeless casing 47, the concentric ridges 48 cooperate with the flange portions of the rim 12 in the manner of a labyrinth seal to prevent any leakage between the casing and the rim.

Mounted in the aperture 22 in the rim 12, in this modification, is an all rubber valve which is indicated generally by reference numeral 49. This valve 49 is similar to the valve 16, but both the valve casing and valve plug thereof differ specifically in some structural details from the corresponding parts of the valve 16. The valve 49 comprises a rubber casing having a base flange 51 of lesser diameter than the flange 18 of valves 16 and 35 and formed integrally with an outwardly extending neck portion 52. The base or inner part of the neck portion 52, like the casing 37 of the valve 35, is of slightly larger external diameter than the rim aperture 22, and a circumferential flange or rib 53 is formed thereon in spaced relationship to the base flange 51 at a distance substantially equal to the thickness of the rim 12. With such construction, this base part of the neck portion 52 cooperates with the aperture 22, as shown in Fig. 6, to establish a leak-proof connection between the valve casing and the wheel rim, and this may be further insured by the provision of an annular groove or grooves 54 in the outer surface of the base flange 51 surrounding the base of the neck portion 52. The outer end of the neck portion 52 may be formed similarly to the neck portion 37 of the valve 35, being provided with a circumferential groove 39 to facilitate mounting of this valve casing in the aperture 22 of the wheel rim. Likewise, the bore of this valve casing is formed similarly to those of the valves 16 and 35, including the restricted portions 27.

The valve plug illustrated as mounted in this valve casing in Fig. 6 is indicated generally by reference numeral 55, and is shown in greater detail in Figs. 8, 9 and 10 separated from the valve casing. This valve plug 55 differs from the previously described valve plug 28 in that it is provided with an axially extending slot or slit 56 which preferably is formed by means of a suitable core member during the molding of this valve plug 55. In other words, the slit 56 differs from the slit 32, 33 of the valve plug 28 by being normally open when the valve plug 55 is separated from the valve casing. As best seen in Fig. 10, the slot or slit 56 preferably has sharp lateral edges, rather than being rounded, to effect an intentional weakening of the side walls of the plug adjacent these edges of the slip 56. Constriction of the body portion of the valve plug by circumferential compression applied thereto by the valve casing, when the plug is mounted in the casing as shown in Fig. 6, will thereby result in collapse of these walls of uneven strength or thickness, which define the slit 56, to effect proper sealing of the slit 56 and firm adherence between adjacent portions of its side walls. Any tendency of this slit to assume a "figure-eight" cross-sectional shape under such circumstances, which might result if the lateral edges of this slit were rounded, thus will be entirely eliminated.

The inner end of this slot or slit 56 terminates in a transversely extending slot 57 short of the inner end of the valve plug 55. As best seen in Fig. 9, the inner end of the valve plug or core 55 is reduced or cut off on diametrically opposed sides in planes normal to the slit 56 to provide a laterally reduced inner end 58. This transverse slot 57, which is similar to the transverse slit 33 in the valve plug 28, extends through such inner end portion 58 of the valve plug 55. As will be readily understood, this valve plug or core 55 is adapted to be inserted in the valve casing in the same manner as previously described with relation to the valve core 28, a suitably formed tool being insertable through the slot 56 into contact with the inner end of the end portion 58 defined by the transverse slot 57 to elongate the valve plug and thereby reduce its cross-sectional area, while restraining its outer end against movement, to enable its insertion into the bore of the valve casing. After being so mounted, as illustrated in Fig. 6, the slot 56 is adapted to receive a hollow needle or other suitable tool for access into the interior of the tire in the same manner as is the valve core 28. In order to facilitate such insertion of an inflating or other tool, the inner edge of the transverse slot 57, defined by the reduced inner end portion 58 of the valve plug 55, is prong-shaped, as illustrated at 59 in Fig. 9. This prong-shaped edge 59 also assists the similarly shaped inner end of an inserting and withdrawing tool in maintaining proper engagement with the inner end portion 58 of the valve plug.

Because of the cross-sectional reduction of the inner end portion 58 of the valve core 55, the formation of the slot 56, 57 may be readily accomplished by means of a suitable core member during the molding of the valve plug. In other words, such configuration of the valve plug will permit ready stripping thereof from such core member, while insuring that the transverse slot 57 extends completely through the inner end portion 58. However, so forming the inner end portion of the valve core results in a somewhat weaker construction at this point than that given the valve plug 28 previously described. Therefore, this inner end portion 58 is provided with a pair of diametrically opposed protuberances 61 (Figs. 8 and 10) for the purpose of strengthening the same and preventing tearing off of this inner end portion during elongation of the valve core preparatory to inserting the same in or withdrawing it from the valve casing. A somewhat similar pair of diametrically opposed protuberances 62 are formed integrally with the main body portion of the valve plug 55 adjacent the ends of the transverse slot 57 and spaced a short distance outwardly from the latter. As best seen in Fig. 8, each of these protuberances 62 preferably includes strengthening fillets 63 disposed at opposite sides of the adjacent end of the transverse slot 57. When the valve plug 55 is mounted in its valve casing, as illustrated in Fig. 6, these protuberances 62 will be disposed directly adjacent the inner surface of the base flange 51. Consequently, they will function to prevent tearing of the rubber during insertion of an inflating tool or other needle-like member, and also will assist in preventing accidental withdrawal of the valve core from the casing during subsequent withdrawal of such a tool. The outer end of this valve core or plug 55 is provided with an enlarged head or flange 64 similar to the flange 29 of the valve plug 28.

Fig. 7 illustrates a further modification of the invention employing a tubeless tire casing 47a which differs from the tubeless casing 47 of Fig. 6 only in that it is provided with a valve casing 65 formed integrally with one of its side walls adjacent the bead of the tire. This integrally formed valve casing 65 is provided with a bore which preferably is shaped in the same manner as those of the separate valve casings 17, 36 and that of the valve 49 of Fig. 6 with restricted portions 27. As illustrated in Fig. 7, it is disposed on the tire casing 47a so as to be conveniently located adjacent the outer edge of the rim 12 of the wheel 11. A valve plug or core 55 may be mounted in this valve casing 65, or a valve core 28 similar to that illustrated in Fig. 3 may be similarly mounted therein.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the forms hereinbefore described being merely preferred embodiments thereof.

I claim:

1. In a wheel and tire assembly having a peripheral fluid chamber, the combination comprising a substantially tubular valve casing of rubber having a portion outside of said fluid chamber connected in communication therewith, a rubber plug in said casing and therewith providing rubber valve means having a valve passage extending longitudinally thereof and communicating with the inside and outside of said chamber, and a portion of said wheel and tire assembly outside of said chamber embracing said portion of said valve casing and cooperating therewith and with said plug to hold a portion of said valve passage closed, the rubber of one of said casing and plug being resiliently yieldable relative to said assembly portion to enable the insertion and withdrawal of conduit means through and from the closed portion of said valve passage for establishing and interrupting communication between the inside and outside of said chamber.

2. In a wheel and tire assembly having a peripheral fluid chamber, the combination according to claim 1 wherein said casing has a portion spaced from said assembly portion, the last said portion of said casing cooperating with said plug yieldably to hold another portion of said valve passage closed, the rubber of one of said casing and plug being resiliently yieldable relative to the other of them to enable the insertion and withdrawal of said conduit means through and from said other portion of said valve passage.

3. In a wheel and tire assembly having a peripheral fluid chamber, the combination according to claim 1 wherein said assembly portion has a valve receiving aperture therethrough with the portion of said casing embraced by said assembly portion disposed in said aperture, said portion of said casing having a diameter greater than that of said aperture when outside thereof.

4. In a wheel and tire assembly having a peripheral fluid chamber, the combination according to claim 1 wherein said assembly portion is a wheel rim having a valve receiving aperture therethrough with said portion of said casing disposed in said aperture, said portion of said casing having a diameter greater than that of said aperture when outside thereof.

5. In a wheel and tire assembly having a peripheral fluid chamber, the combination according to claim 1 wherein said assembly portion is a tire casing having a valve receiving aperture therethrough with said portion of said valve casing disposed in said aperture, said portion of said valve casing having a diameter greater than that of said aperture when outside thereof.

6. In a wheel and tire assembly having a peripheral fluid chamber, the combination according to claim 1 wherein said valve passage comprises an axial passage in said plug and the rubber of said plug is resiliently yieldable relative to said casing.

7. In a wheel and tire assembly having a peripheral fluid chamber, the combination according to claim 1 wherein said plug has a diameter greater than the inside diameter of said casing when outside thereof and the rubber of said valve means is sufficiently resilient that the plug is axially withdrawable from the casing by pulling the plug through the outer end of said casing.

8. In a wheel and tire assembly having a peripheral fluid chamber, the combination according to claim 1 wherein said assembly portion has a valve receiving aperture therethrough with said portion of said casing disposed in said aperture, said portion of said casing having a diameter greater than that of said aperture when outside thereof, and said casing having flange means integral with and extending radially outwardly from the periphery of said casing at opposite sides of said assembly portion, said flange means being engageable with opposite sides of said assembly portion, respectively, to resist axial movement of said casing relative to said assembly portion.

9. In a wheel and tire assembly having a peripheral fluid chamber, the combination comprising a substantially tubular valve casing in a wall of said chamber and communicating with the inside and outside thereof, a relatively resilient rubber plug of greater diameter than the internal diameter of said value casing when outside thereof, disposed in and closing said casing, and having an inner end portion protruding from the inner end of said casing in said chamber, said plug having an axial valve passage including an inner end in said inner end portion of said casing for communication with said chamber and extending from said inner end outwardly through said plug for communication with the outside of said chamber, and axially spaced flange means in said casing embracing axially spaced portions of said plug therein and cooperating with the elasticity of said plug yieldably to hold spaced portions of said valve passage closed and to constrict the intermediate portion of said valve plug to a lesser degree than said axially spaced portions thereof, the rubber of said plug being resiliently yieldable relative to said flange means while in said casing to enable the insertion and withdrawal of conduit means through and from said axial passage for establishing and interrupting communication between the inside and outside of said chamber.

10. In a wheel and tire assembly having a peripheral fluid chamber, the combination according to claim 9 wherein said inner end portion of said plug includes integral flange means extending radially outwardly from the periphery of said inner end portion in said chamber, inwardly adjacent and engageable with the inner end of said casing to resist axial movement of said plug in said casing in a direction outwardly from said chamber.

11. In a wheel and tire assembly including a pair of axially spaced, coaxial rim carrying means, each having a rim and a peripheral fluid chamber about said rim, the combination comprising a substantially tubular valve casing of rubber, a tubular member connected at its opposite ends in communication with said valve casing and the peripheral fluid chamber of one of said rim carrying means, respectively, a rubber plug in said valve casing and therewith providing rubber valve means having a valve passage extending longitudinally thereof and communicating at one end through said tube with the inside of the last said peripheral fluid chamber and at its other end with the outside thereof, and a portion of the other of said rim carrying means embracing said valve casing and cooperating therewith and with said plug to hold a portion of said valve passage closed, the rubber of one of said valve casing and plug being resiliently yieldable relative to said portion of said other of said rim carrying means to enable the insertion and withdrawal of conduit means through and from the closed portion of said valve passage for establishing and interrupting communication between the inside and outside of the last said peripheral fluid chamber.

IRL I. TUBBS.

References Cited in the file of this patent

UNITED STATES PATENTS

| Number | Name | Date |
|---|---|---|
| 612,570 | Pickett | Oct. 18, 1898 |
| 1,728,825 | Green | Sept. 17, 1929 |
| 2,064,695 | Sipe | Dec. 15, 1936 |
| 2,082,972 | Perry | June 8, 1937 |
| 2,272,886 | Wilson | Feb. 10, 1942 |
| 2,318,115 | Tubbs | May 4, 1943 |

FOREIGN PATENTS

| Number | Country | Date |
|---|---|---|
| 165,087 | Great Britain | Dec. 15, 1921 |